(12) United States Patent
Baba et al.

(10) Patent No.: US 6,710,903 B2
(45) Date of Patent: Mar. 23, 2004

(54) METHOD AND APPARATUS FOR FORMULATING IMAGE DATA, METHOD AND APPARATUS FOR CONVERTING IMAGE DATA, METHOD AND APPARATUS FOR FORMULATING HOLOGRAPHIC STEREOGRAM, RECORDING MEDIUM AND DATA TRANSMITTING METHOD

(75) Inventors: Shigeyuki Baba, Tokyo (JP); Akira Shirakura, Tokyo (JP); Nobuhiro Kihara, Kanagawa (JP)

(73) Assignee: Sony Corporation (JP)

( * ) Notice: Subject to any disclaimer, the term of this patent is extended or adjusted under 35 U.S.C. 154(b) by 0 days.

(21) Appl. No.: 10/084,315

(22) Filed: Feb. 28, 2002

(65) Prior Publication Data

US 2002/0159108 A1 Oct. 31, 2002

Related U.S. Application Data

(63) Continuation of application No. 09/359,656, filed on Jul. 26, 1999, now Pat. No. 6,377,371.

(30) Foreign Application Priority Data

Jul. 29, 1998 (JP) .......................................... P10-214602

(51) Int. Cl.$^7$ ................................................ G03H 1/26
(52) U.S. Cl. .......................................... 359/23; 359/470
(58) Field of Search ............................ 359/23, 9, 470, 359/467, 469

(56) References Cited

U.S. PATENT DOCUMENTS

| RE35,029 E | * | 8/1995 | Sandor | 355/22 |
| 5,663,815 A | * | 9/1997 | Molteni | 359/13 |
| 5,703,704 A | * | 12/1997 | Nakagawa | 359/9 |

FOREIGN PATENT DOCUMENTS

| EP | 0 816 951 A2 | 7/1998 |
| JP | 10-20754 | 1/1998 |

* cited by examiner

Primary Examiner—Drew Dunn
Assistant Examiner—Leo Boutsikaris
(74) Attorney, Agent, or Firm—Rader, Fishman & Grauer PLLC; Ronald P. Kananen

(57) ABSTRACT

In a system in which images having parallax data, and which are made up of plural images containing the parallax information, are processed with viewing point conversion, and the resulting new images having parallax data are used, as in a system of generating a holographic stereogram, a unit for generating the images having parallax data is to be independent from other unit or units. To this end, the information necessary to perform viewing point conversion processing of converting the viewing point for an object is attached to images having parallax data when the images having parallax data have been produced. When the images having parallax data is exchanged between the unit for generating the images having parallax data and other unit or units, the exchanged images having parallax data need to be those to which the information has been attached.

27 Claims, 13 Drawing Sheets

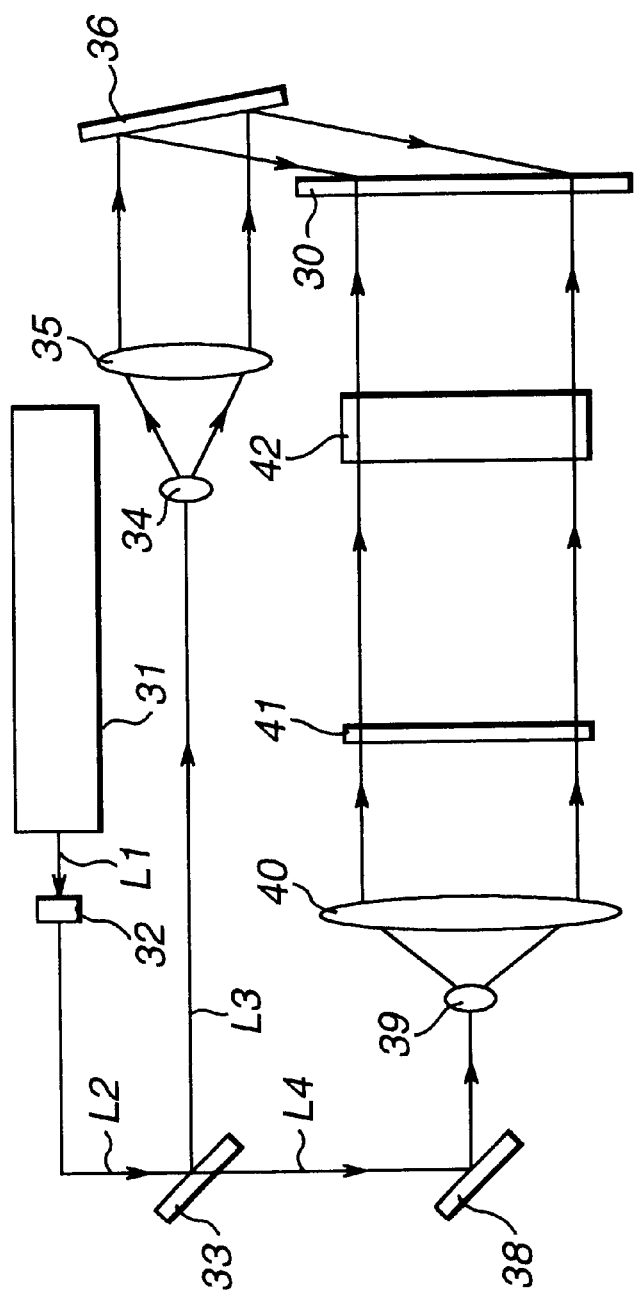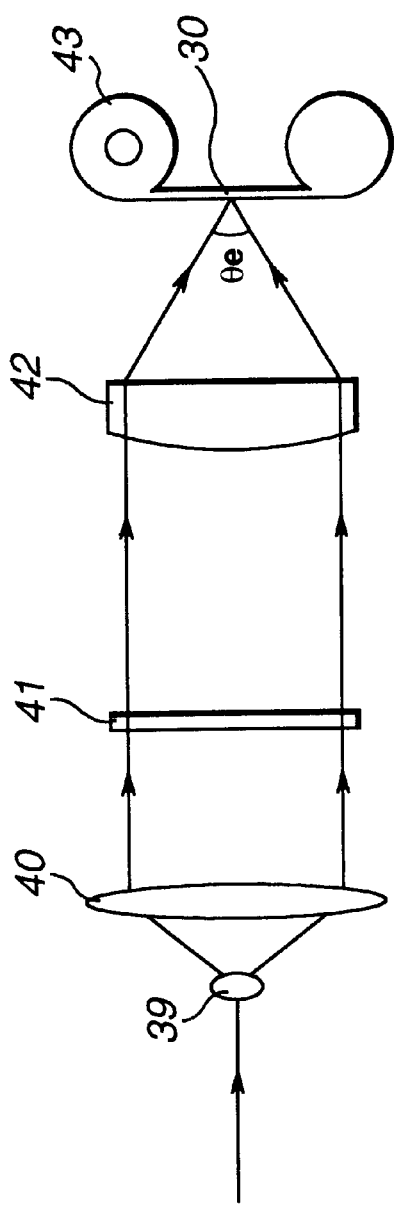
FIG.13A
FIG.13B

METHOD AND APPARATUS FOR FORMULATING IMAGE DATA, METHOD AND APPARATUS FOR CONVERTING IMAGE DATA, METHOD AND APPARATUS FOR FORMULATING HOLOGRAPHIC STEREOGRAM, RECORDING MEDIUM AND DATA TRANSMITTING METHOD

The present application is a continuation of the patent application Ser. No. 09/359,656 filed Jul. 26, 1999, now U.S. Pat. No. 6,377,371.

BACKGROUND OF THE INVENTION

1. Field of the Invention

This invention relates to an image data generating method and apparatus for generating data of a parallax image string used for generating a holographic stereogram. This invention also relates to an image data converting method and apparatus for processing data of an parallax image string with viewing point conversion to generate data of a new parallax data. This invention also relates to a method and apparatus for generating a holographic stereogram based on data of the parallax image string. This invention also relates to a recording medium having stored therein data of the parallax image string used for generating a holographic stereogram. This invention similarly relates to a method for transmitting data of the parallax image string used for formulating a holographic stereogram.

2. Description of the Related Art

A holographic stereogram is prepared by sequentially recording a large number of images, as original images, on a sole recording medium for hologram as a strip-shaped or dot-shaped element hologram. These images have been obtained by sequentially imaging an object from different viewing points.

For example, in generating a holographic stereogram having the parallax information only in the transverse direction, an object 100 is sequentially imaged from different viewing points of the transverse direction to produce a parallax image string 101 made up of plural images having the parallax information only in the transverse direction. The images 102 making up the parallax image string 101 are sequentially recorded as strip-shaped elementary holograms on a recording medium for hologram 103 so that these images 102 will be consecutive to one another in the transverse direction. This yields a holographic stereogram carrying the parallax information in the transverse direction.

In this holographic sterogram, in which the information of the plural images 102, obtained on sequentially imaging the object from plural viewing points of the transverse direction, is sequentially recorded as strip-shaped elementary holograms so that the images 102 will be consecutive to one another, two-dimensional images, as viewed by left and right eyes, differ from each other if this holographic stereogram is viewed by a viewer with both eyes. This causes the viewer to perceive the parallax so that a three-dimensional image is reproduced.

Meanwhile, the string of parallax images, from which the holographic stereogram is derived, is produced by translating a camera 104 directed to the object 100, as the camera 104 is oriented in a fixed direction, and by imaging the object 100 a large number of times. That is, the camera 104, oriented towards the object 100, is translated from a position in which the object 100 enters an imaging range by the camera 104, to a position in which the object 100 is moved out of the imaging range by the camera 104, and by imaging the object a large number of times during this time interval, whereby a parallax image string, from which is originated the holographic stereogram, is produced. Meanwhile, this system of translating the camera 104 as the latter is kept in a fixed direction is termed a straight track system.

It is noted that, in a holographic stereogram, the relative position between the viewing point of the camera 104 and the object 100 at the time of imaging is kept in the reproduced image of the generated hologram as well. Thus, if the parallax image string, produced as described above, is directly used for generating a holographic stereogram, a reproduced image Z is formed at a more recessed position than the hologram plane Ha of the holographic stereogram H. Therefore, with this holographic stereogram, a reproduced image Z is distorted or blurred, unless a viewer sees the reproduced image Z, with the viewing point S set on the hologram plane Ha, so that the distance dO between the reproduced image Z and the reproduced image Z of the viewer coincides with the distance d between the object 100 and a viewing point of the camera 104 at the time of imaging.

Thus, for dissolving this problem in the preparation of the holographic stereogram, it is necessary to perform viewing point conversion processing on data of the original parallax image string so that the reproduced image Z will be formed in the vicinity of the hologram plane Ha of the holographic stereogram H, as shown in FIG. 4. By this viewing point converting processing, the reproduced image Z is free of distortion or blurring even if the viewing point S is set at a position remote from the hologram plane Ha.

In our Japanese Patent Application H-8-170018, corresponding to Japanese Laying-Open Patent H-10-20754, the present Assignee has proposed a system of performing viewing point conversion processing on data of the parallax image string to generate a holographic stereogram. In this system, an object is imaged from different viewing points to prepare data of a parallax image string, this data of the parallax image string is processed with viewing point conversion and the resulting converted data is used to generate a holographic stereogram.

This system, however, tends to be bulky on a whole since it is made up of a mechanism for generating data of a parallax image string, a mechanism for viewing point conversion processing and a mechanism for generating the holographic stereogram.

SUMMARY OF THE INVENTION

It is therefore an object of the present invention to provide a system for performing viewing point conversion on data of a parallax image string made up of plural images having the parallax information, such as the system for generating a holographic stereogram, in which a mechanism for generating the data of the parallax image string can be independent from other mechanisms.

In one aspect, the present invention provides a image data processing system including means for formulating images having parallax data, made up of a plurality of images of an object from different viewing points, and data attachment means for attaching the information necessary for performing the viewing point conversion processing of converting the viewing points for the object on the images having parallax data.

In another aspect, the present invention provides a method for processing image data including generating images having parallax data, made up of a plurality of images of an object from different viewing points, and attaching the information necessary for performing the viewing point conversion processing of converting the viewing points for the object on the images having parallax data to the images having parallax data.

In still another aspect, the present invention provides an image data converting system including data receiving means for receiving images having parallax data, made up of a plurality of images of an object from different viewing points, and the information necessary for performing the viewing point conversion processing of converting the viewing points for the object on the images having parallax data, and viewing point conversion means for performing viewing point conversion processing, on the basis of the information, on the images having parallax data, as received from the data receiving means.

In still another aspect, the present invention provides an image data converting method including inputting images having parallax data, made up of a plurality of images of an object from different viewing points, and the information necessary for performing the viewing point conversion processing of converting the viewing points for the object on the images having parallax data, to computing processing means, and performing viewing point conversion processing, on the basis of the information, on the images having parallax data.

In still another aspect, the present invention provides a holographic stereogram printing system including data receiving means for receiving images having parallax data, made up of a plurality of images of an object from different viewing points, and the information necessary for performing the viewing point conversion processing of converting the viewing points for the object on the images having parallax data, and viewing point conversion means for performing viewing point conversion processing, on the basis of the information, on the images having parallax data, as received from the data receiving means, and means for generating a holographic stereogram using new images having parallax data, as obtained on executing viewing point conversion processing by the viewing point conversion means.

In still another aspect, the present invention provides a method for generating a holographic stereogram including inputting images having parallax data, made up of a plurality of images of an object from different viewing points, and the information necessary for performing the viewing point conversion processing of converting the viewing points for the object on the images having parallax data, to computing processing means, performing viewing point conversion processing, on the basis of the information, on the images having parallax data, by the computing processing means, to produce new images having parallax data, and using the new images having parallax data for generating a holographic stereogram.

In still another aspect, the present invention provides a computer-readable recording medium in which there are stored images having parallax data, made up of plural images of an object from different viewing points, and data required for executing the viewing point conversion processing of converting the viewing points for the object on the images having parallax data.

In yet another aspect, the present invention provides a data transmission method including collectively transmitting images having parallax data, made up of a plurality of images of an object from different viewing points, and the information necessary for performing the viewing point conversion processing of converting the viewing points for the object on the images having parallax data.

According to the present invention, as described above, it is possible, in a system in which images having parallax data, and which are made up of plural images having the parallax information, are processed with viewing point conversion, and the resulting new images having parallax data are used, as in a system of generating a holographic stereogram, to provide a unit for generating data of a parallax image string independently of other unit or units.

Thus, according to the present invention, a studio for imaging a parallax image string, a data processing center for viewing point conversion and a printing laboratory for generating a holographic stereogram may be provided independently of one another.

BRIEF DESCRIPTION OF THE DRAWINGS

FIGS. 13A, 13B shows an illustrative structure showing an optical system of a holographic stereogram printer.

DESCRIPTION OF THE PREFERRED EMBODIMENTS

Figure 1:
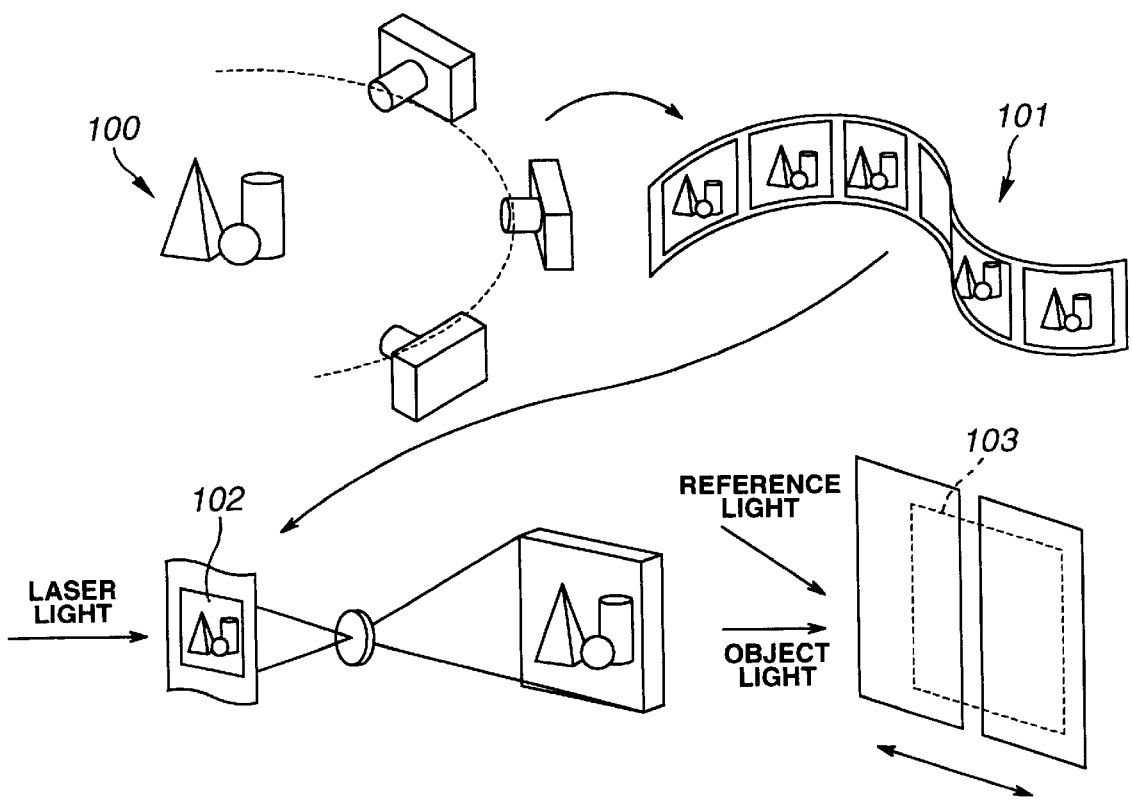
FIG. 1 schematically shows a method for generating a holographic stereogram.
Figure 2:
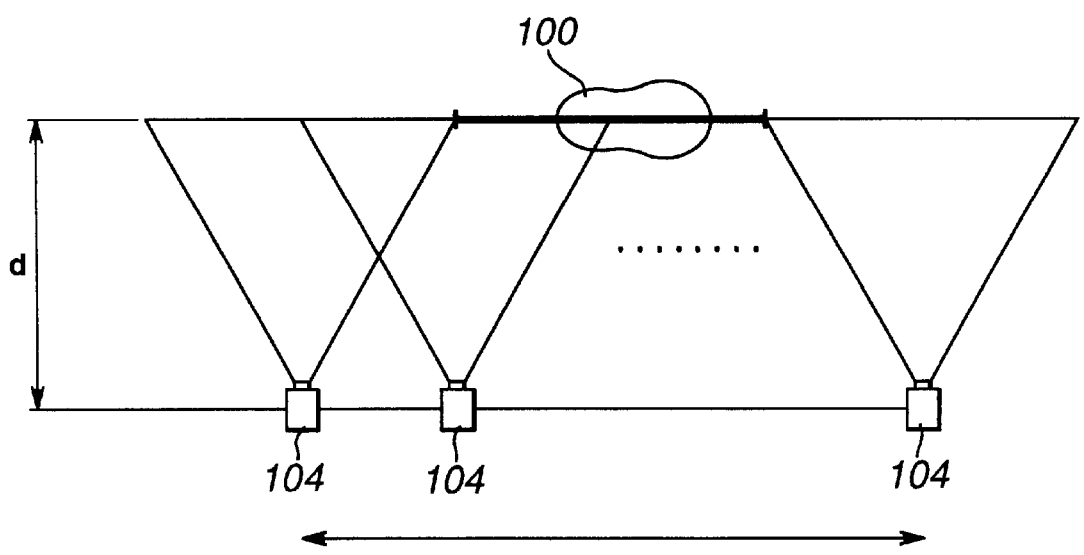
FIG. 2 shows a method for imaging a parallax image string by the straight track system.
Figure 3:
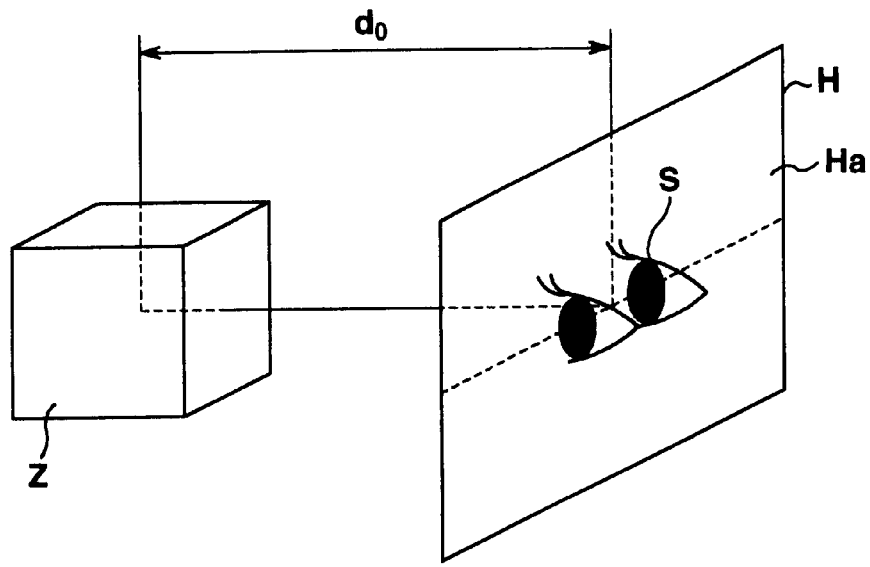
FIG. 3 shows the manner in which a reproduced image of a holographic stereogram generated without viewing point conversion processing is being viewed.

Referring to the drawings, preferred embodiments of the present invention will be explained in detail. Although the present invention is applied to a holographic stereogram generating system, by way of an example, in the following explanation, the method and apparatus for formulating image data, and the method and apparatus for converting image data according to the present invention, can be extensively applied to any technical field in need of viewing point conversion processing. For example, there are occasions wherein the viewing point conversion processing is executed when displaying a stereo image on a display device by taking advantage of the parallax. The method and apparatus for formulating image data and the method and apparatus for converting image data according to the present invention can be applied to such case. Holographic Stereogram Generating System First, the application of the present invention to a holographic stereogram generating system, embodying the present invention, is explained.

Figure 5:
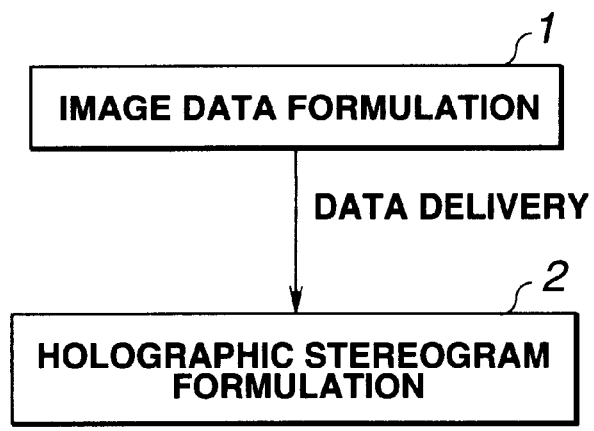
FIG. 5 is a block diagram showing an illustrative structure of a holographic stereogram generating system.

In this holographic stereogram generating system, data of a parallax image string, having attached thereto the information necessary for performing the viewing point conversion processing, is generated by an image data generating device 1 of the present invention, as shown in FIG. 5. The generated data is delivered, via a recording medium or a network etc, to a holographic stereogram generating device 2 of the present invention. The holographic stereogram generating device 2 performs viewing point conversion processing on the data received via a recording medium or network etc to generate new data of the parallax image string to generate a holographic stereogram. The image data generating device 1 and the holographic stereogram generating device 2 making up such system is hereinafter explained in detail.

Figure 6:
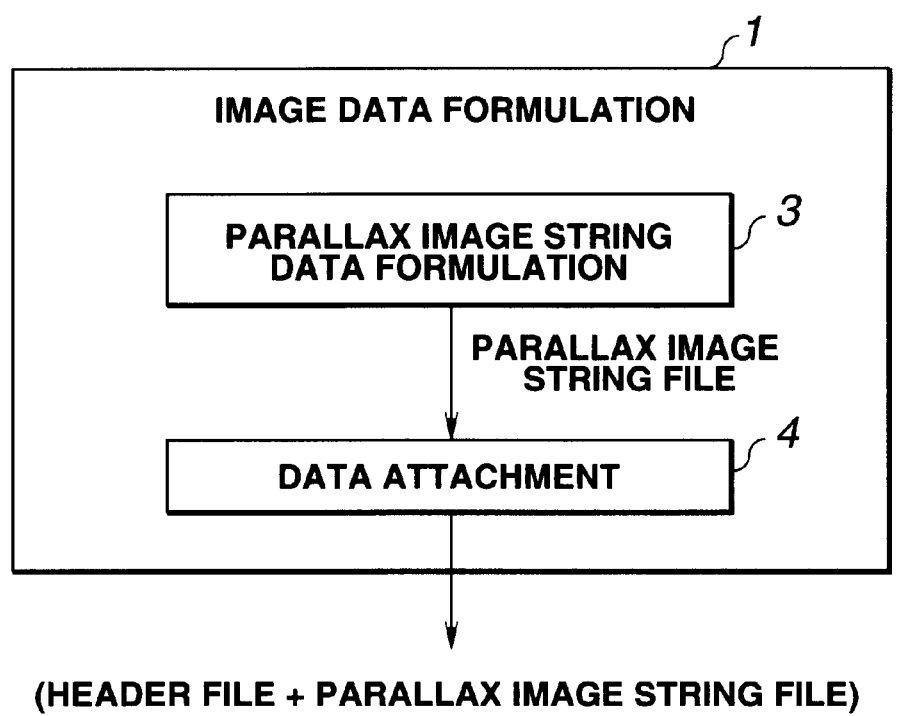
FIG. 6 is a block diagram showing an illustrative structure of an image data generating system according to the present invention.

Referring to FIG. 6, the image data generating device 1 includes a parallax image string data generating unit 3 and a data attachment unit 4. The data attachment unit 4 also attaches the information necessary for performing viewing point conversion processing on the data of the parallax image string to the data of the parallax image string formulated by the parallax image string data generating unit 3.

The parallax image string data generating unit 3 is made up of an imaging device for imaging a parallax image string made up of plural images of the object from different viewing points, and a computer for converting the image formed by the imaging device into data of e.g., a pre-set two-dimensional image format. That is, the parallax image string data generating unit 3 images the object by the imaging device from plural different viewing points, and captures the images, as shot by the imaging device, into a computer, in order to formulate data of the parallax image string.

Among the imaging methods for the parallax image string, there are, for example, a straight track system, a panning system, a rotating system and a re-centering system. Although the parallax image string used for formulation of the holographic stereogram may be imaged by any of these systems, it is necessary to change the technique of viewing point conversion processing with the particular imaging system used.

Figure 7:
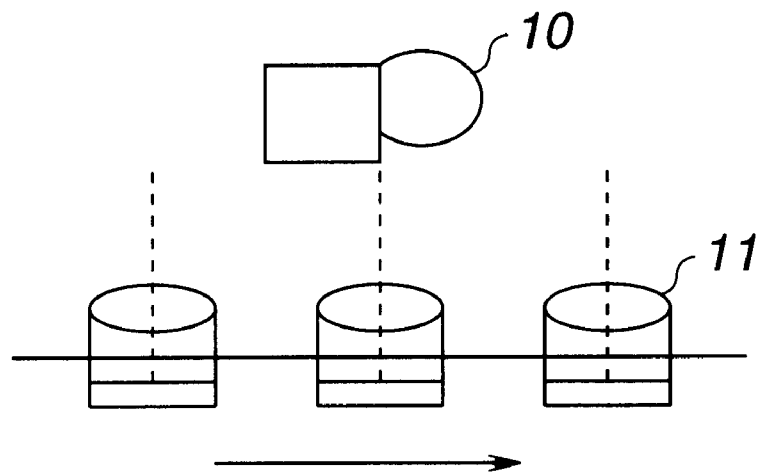
FIG. 7 shows a method for imaging a parallax image string by the straight track system.

In the straight track system, the a camera 11, directed to the object 10, is translated along a straight rail, as the camera is maintained in a fixed direction, to image the object a large number of times from different positions, as shown in FIG. 7. That is, when imaging a parallax image string by the straight track system, the camera 11 directed to the object 10 is translated, from a position in which the object 10 enters the imaging range of the camera 11, to a position in which the objects departs the imaging range, to image the object a large number of times during this movement.

Figure 8:
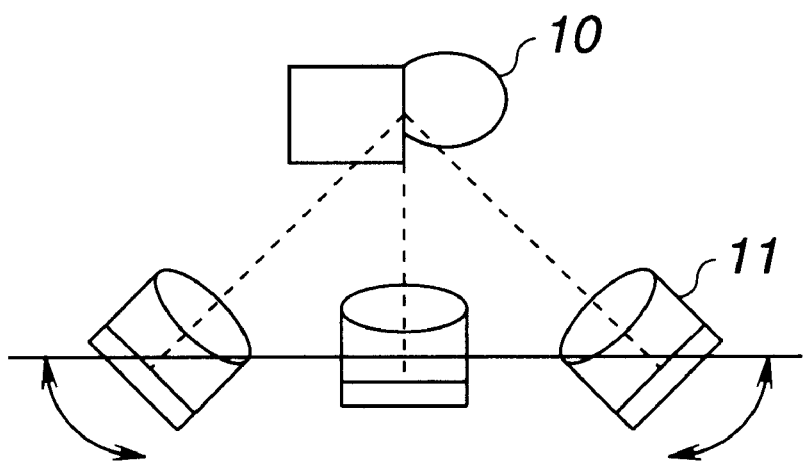
FIG. 8 shows a method for imaging a parallax image string by the panning system.
Figure 9:
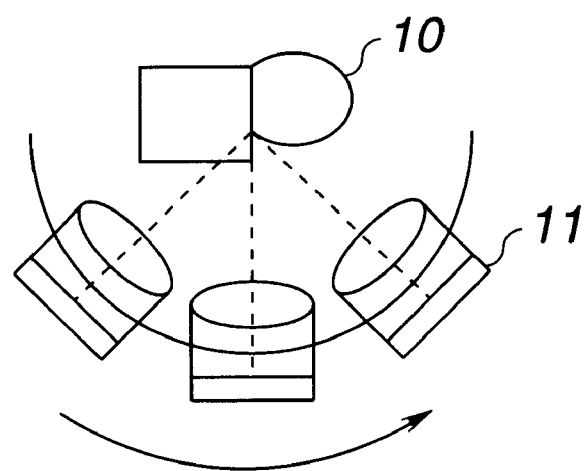
FIG. 9 shows a method for imaging a parallax image string by the rotating system.

In the panning system, the camera 11 is translated along a straight rail, as the direction of the camera 11 is changed so that the camera is perpetually directed to the center of the object 10, and the object 10 is shot from different positions, as shown in FIG. 8. That is, when imaging a parallax image string by the panning system, the camera 11 directed to the object 10 is translated, as the camera is panned towards the center of the object 10, to image the object a large number of times during this camera movement.

In the panning system, the image can be improved in effective resolution by the camera panning than is possible with the straight track system. However, in generating a planar-shaped holographic stereogram from a parallax image string as shot by the panning system, it is necessary to correct the keystone distortion contained in the parallax image string. It is noted that the technique of viewing point conversion processing when generating a holographic stereogram from the parallax image string as shot by the panning system is described in, for example, Japanese Patent Application H-8-302691, corresponding to the Japanese Laying-Open Patent H-10-143058.

In the rotating system, the camera 11 directed to the center of the object 10 is moved along an arcuate path to image a parallax image string. In the rotating system, since the camera 11 is directed at all times to the center of the object 10, the image can be improved in effective resolution than in the straight track system. However, if a planar-shaped holographic stereogram is to be formulated from a parallax image string as shot by the rotating system, the keystone distortion contained in the parallax image string needs to be corrected as in the case of the panning system. The technique for viewing point conversion processing when formulating the holographic stereogram from the parallax image string as shot by the rotating system is described in, for example, the Japanese Patent Application H-8-170018 corresponding to Japanese Laying-Open Patent H-10-20754.

Figure 10:
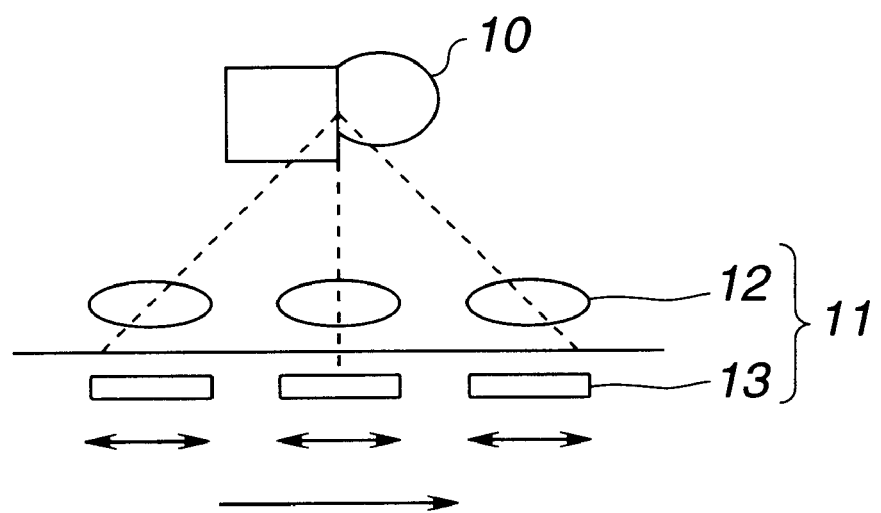
FIG. 10 shows a method for imaging a parallax image string by the re-centering system.

In the re-centering system, the camera 11 is translated along a straight rail to shoot the object 10 a large number of times from different positions and, during the imaging operation, a lens 12 of the camera 10 is moved in agreement with the shooting position so that the image of the object 10 will be perpetually located at the center of an imaging plane 13, as shown in FIG. 10. That is, in the re-centering system, the object 10 is projected at all times on the center of an imaging plane 13 of the camera 11 for imaging, by varying the relative position between the lens 12 and the imaging plane 13 of the camera 11 in agreement with the movement of the main body unit of the camera 11. In the re-centering system, the image obtained on shooting can be improved without producing the keystone distortion.

The parallax image string data generating unit 3 captures the images, obtained by imaging the object 10 by the above-mentioned technique, into the computer, to convert the images into data of the two-dimensional image format to formulate an image file. It is noted that the format of the image file is optional and may, for example, be the format of a BMP or TIFF. In preparing the image file, the data may also be compressed, using an image compressing technique, such as JPEG. In particular, since the parallax image string is made up of images as shot at proximate viewing point positions, the respective images in general exhibit extremely high correlation, so that, if the image compression technique exploiting the motion prediction, such as MPEG, is used, the data can be compressed with highly efficiency to reduce the data volume significantly.

The respective images, obtained on imaging the object 10 as described above, are converted into data of the two-dimensional image format to formulate an image file. Thus, the parallax image string data generating unit 3 formulates plural image files as data of the parallax image string. In the following explanation, these plural image files, formulated as described above, are collectively termed a parallax image string file.

That is, if the object 10 is imaged by an imaging device from 500 different viewing points, the parallax image string data generating unit 3 formulates a parallax image string file made up of 500 image files. Although it is assumed here that an image is handled as an image file, and a parallax image string file is made up of a large number of image files, it is possible with the present invention to collect plural images into a sole image file.

In the above-described embodiment, the object 100 is actually imaged to generate a parallax image string file. Alternatively, computer graphics may also be used to formulate a parallax image string file. That is, the parallax image string data generating unit 3 is also able to use the computer graphics function by a computer in place of the imaging by an imaging device as described above.

If the parallax image string file is to be generated using the computer graphics, the object 10 and the camera 11 are placed imaginarily in the computer graphics space and the camera 11 is moved at a pre-set pitch to image the object 10 a large number of times from different positions. Stated differently, the viewing point of the camera 11 is moved at a pre-set pitch and data of plural images having different viewing points are formulated by rendering the images of the object 10 as seen from the different viewing points. By so doing, it is similarly possible to generate a parallax image string file comparable to the parallax image string file obtained on converting the actually shot images of the object 10 into data of the two-dimensional image format.

In the image data generating device 1 embodying the present invention, the information necessary to effect viewing point conversion processing on the parallax image string file formulated by the parallax image string data generating unit 3 is appended by the data attachment unit 4 to the formulated parallax image string file.

Specifically, the data attachment unit 4 formulates a header file, having stored therein the information necessary for applying the viewing point conversion processing, and attaches the header file to a parallax image string file. In the following explanation, the parallax image string file, having the attached header file, is termed the pre-viewing-point conversion parallax image string data file. That is, the pre-viewing-point conversion parallax image string data file contains a header file and an image file of respective images making up a parallax image string. Preferably, the information on the conditions for formulating a holographic stereogram is also contained in the header file. The information stored in the header file will be explained later by giving specified examples.

The function of the data attachment unit 4 may be implemented by a computer used for formulating the parallax image string file by the parallax image string data generating unit 3. That is, when the parallax image string file is to be formulated by the computer, a header file is simultaneously prepared and attached to the parallax image string file to prepare the pre-viewing-point conversion parallax image string data file.

The image data generating device 1 formulates the pre-viewing-point conversion parallax image string data file, comprised of a parallax image string file and a header file attached thereto, as described above. This pre-viewing-point conversion parallax image string data file is delivered, via a recording medium or a network, to the holographic stereogram generating device 2.

Meanwhile, a recording medium, as a mediator for delivery of the pre-viewing-point conversion parallax image string data file, is a recording medium according to the present invention, that is a recording medium having stored therein the pre-viewing-point conversion parallax image string data file, made up of data of the parallax image string comprised of plural images of the object from different viewing points, that is parallax image string file, and data necessary for performing viewing point conversion processing of changing the viewing points for the object 10 on the parallax image string data, that is header file.

The recording medium in which the pre-viewing-point conversion parallax image string data file is stored may be any suitable recording medium, such as an optical disc, a magneto-optical disc, a magnetic disc or a magnetic tape. In delivering the pre-viewing-point conversion parallax image string data file by data transmission on a network, the type of the network may be optionally selected, such that the data file may be delivered over the Internet.

Figure 11:
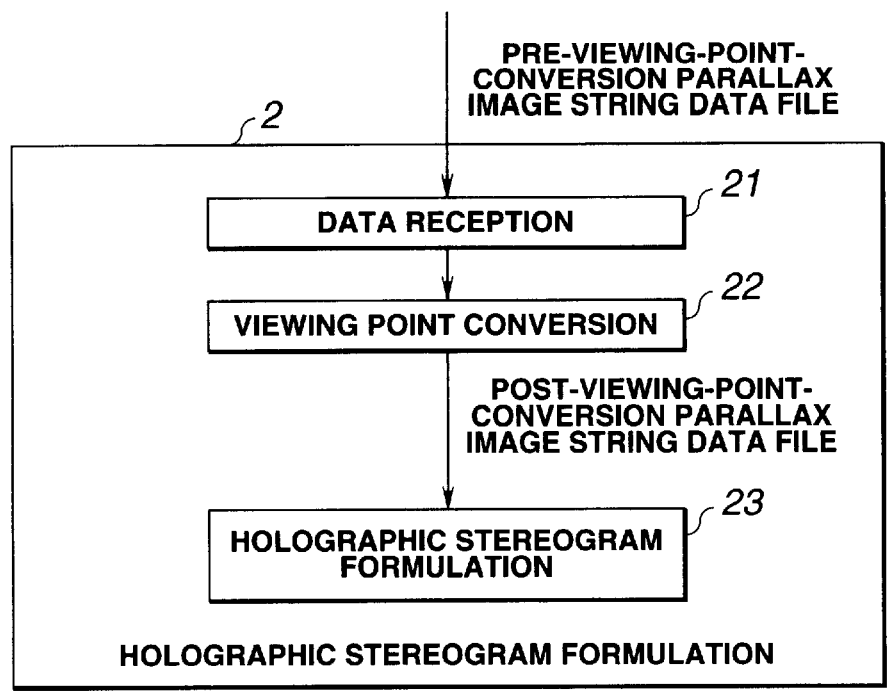
FIG. 11 is a block diagram showing an illustrative structure of a holographic stereogram generating device according to the present invention.

The holographic stereogram generating device 2, to which the pre-viewing-point conversion parallax image string data file is delivered from the image data generating device 1, includes a data receiving unit 21, a viewing point conversion unit 22, and a holographic stereogram generating unit 23, as shown in FIG. 11.

The data receiving unit 21 is used for receiving the pre-viewing-point conversion parallax image string data file. Specifically, if the pre-viewing-point conversion parallax image string data file is to be received over the Internet, the data receiving unit 21 is constituted by a communication device, such as a terminal adapter or modem. Also, if the pre-viewing-point conversion parallax image string data file is to be received via a recording medium, the data receiving unit 21 is constituted by a driving device adapted to read out data from the recording medium.

The data receiving unit 21 delivers the pre-viewing-point conversion parallax image string data file, received via the recording medium or the network etc, to the viewing point conversion unit 22. The viewing point conversion unit is a computer having stored therein a viewing point conversion program. The viewing point conversion unit 22 executes this viewing point conversion program to perform viewing point conversion processing on the data of the parallax image string stored in the pre-viewing-point conversion parallax image string data file. At this time, the viewing point conversion unit 22 executes the viewing point conversion processing based on the information stored in the header file in the pre-viewing-point conversion parallax image string data file. This viewing point conversion processing will be explained later by giving a specified example.

As the result of the viewing point conversion processing, executed on the basis of the information stored in the header file of the pre-viewing-point conversion parallax image string data file, the viewing point conversion unit 22 outputs a header file and a new parallax image string file, prepared by the viewing point conversion processing. Meanwhile, since the new parallax image string file, prepared by the viewing point conversion processing, performed by the viewing point conversion unit 22, is a file of images for light exposure at the time of preparation of the holographic stereogram, this new parallax image string file, prepared by the viewing point conversion processing, performed by the viewing point conversion unit 22, is herein termed an image string file for light exposure. The header file and the image string file for light exposure are collectively termed a post-viewing-point conversion parallax image string data file.

From the viewpoint solely of formulating the holographic stereogram, it is unnecessary to attach a header file to the post-viewing-point conversion parallax image string data file. However, attachment of the header file to the post-viewing-point conversion parallax image string data file gives rise to a merit that the conditions under which the viewing point conversion processing has been executed can be known on late checking of the post-viewing-point conversion parallax image string data file.

If a header file is to be attached to the post-viewing-point conversion parallax image string data file, the information on the image string file for light exposure, such as the name of the image string file for light exposure or the date of preparation thereof, is preferably included in the header file. If the information on the parallax image string for light exposure is appended to the header file, it can be comprehended which parallax image string for light exposure is stored, simply on checking the header file.

The post-viewing-point conversion parallax image string data file, prepared by the viewing point conversion unit 22 as described above, is delivered to the holographic stereogram generating unit 23. The holographic stereogram generating unit 23 formulates the holographic stereogram based on the received post-viewing-point conversion parallax image string data file.

A specified example of the holographic stereogram generating unit 23, generating the holographic stereogram on reception of the post-viewing-point conversion parallax image string data file as described above, is now explained in detail. Meanwhile, the holographic stereogram generating unit 23, now explained, directly outputs a film-shaped recording medium for hologram, having interference fringes of the object light and the reference light, recorded thereon, as a holographic stereogram. The holographic stereogram, comprised of the interference fringes of the object light and the reference light, directly recorded on the recording medium for hologram, is generally termed a one-step holographic stereogram.

Figure 12:
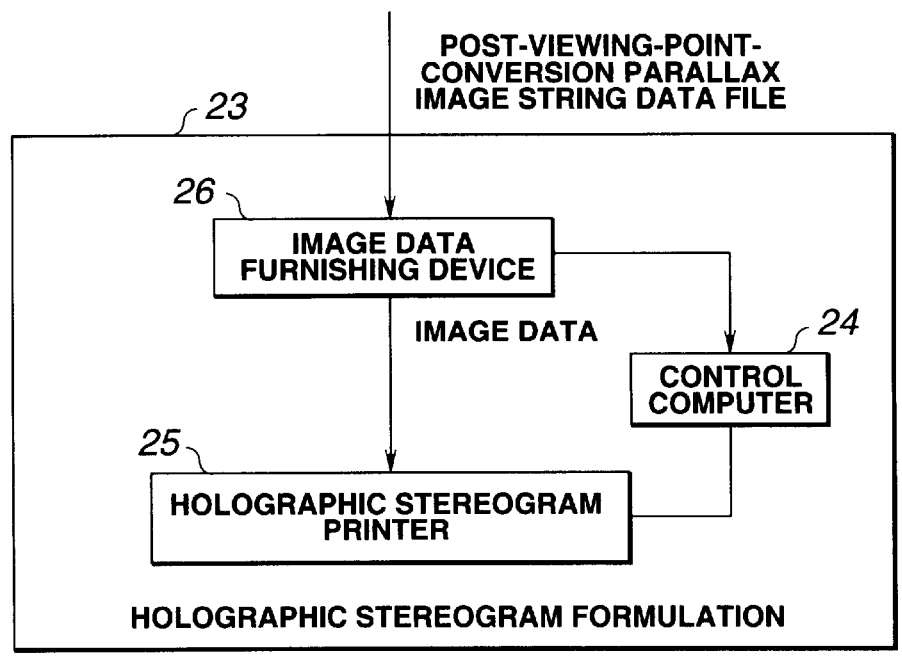
FIG. 12 is a block diagram showing an illustrative structure of a holographic stereogram generating unit.

Referring to FIG. 12, the holographic stereogram generating unit 23 includes a control computer 24 for controlling the holographic stereogram generating unit in its entirety, a holographic stereogram printer 25, having the optical system for formulating the holographic stereogram, and an image data furnishing device 26 for supplying image data of an image for light exposure to the holographic stereogram printer 25.

When recording an image on the recording medium for a hologram, the image data furnishing device 26 sequentially reads out data for one image file, from the image string file for light exposure constituting the post-viewing-point conversion parallax image string data file generated by the viewing point conversion unit 22 as described above, to route the image data to the holographic stereogram printer 25. When sending image data for one image to the holographic stereogram printer 25, the image data furnishing device 26 sends out a timing signal indicating that effect to the control computer 24.

Based on the timing signal from the image data furnishing device 26, the control computer 24 drives the holographic stereogram printer 25. Under control by the control computer 24, the holographic stereogram printer 25 sequentially records images, corresponding to image data furnished from the image data furnishing device 26, to a recording medium for hologram, loaded in the holographic stereogram printer 25, as strip-shaped elementary holograms.

At this time, the control computer 24 controls a light exposure shutter and a recording medium feed mechanism etc, provided in the holographic stereogram printer 25, as will be explained subsequently. That is, the control computer 24 sens out control signals to the holographic stereogram printer 25 to control the opening/closure of the light-exposure shutter or the feed operation of the recording medium for hologram by the recording medium feed mechanism.

Referring to FIG. 13, the holographic stereogram printer 25 is explained in further detail. FIG. 13A is a top plan view of the entire optical system of the holographic stereogram printer 25, and FIG. 13B is a side view of the object light portion of the optical system of the holographic stereogram printer 25.

Referring to FIG. 13A, the holographic stereogram printer 25 includes a laser light source 31, for radiating laser light of a pre-set wavelength, a light-exposure shatter 32 arranged on the optical axis of the laser light L1 from the laser light source 31 and a half-mirror 33.

The light-exposure shatter 32 is controlled by the control computer 24 and is closed and opened when a recording medium for hologram 30 is not exposed to light or is exposed to light, respectively. The half-mirror 33 is used for separating the laser light transmitted through the light-exposure shutter 32 into reference light and object light. The light L3 reflected by the half-mirror 33 becomes the reference light, whereas the light L4 transmitted through the half-mirror 33 becomes the object light.

On the optical axis of the light L3, reflected by the half-mirror 33, there are arranged, as an optical system for reference light, a cylindrical lens 34, a collimator lens 35, for collimating the reference light, and a total reflection mirror 36, for reflecting the light collimated by the collimator lens 35.

The light reflected by the half-mirror 33 is first turned into divergent light by the cylindrical lens 34 and then collimated by the collimator lens 35. The collimated light is reflected by the total reflection mirror 36 to fall on the recording medium for hologram 30.

On the optical axis of the light L4, transmitted through the half-mirror 33, there are arranged, as an optical system for the object light, a total reflection mirror 38, for reflecting the light transmitted through the half-mirror 33, a spatial filter 39, combined from a convex lens and a pin-hole, a collimator lens 40 for collimating the object light, a display device 41, for displaying an image of an object for recording, and a cylindrical lens 42 for condensing the object light on the recording medium for hologram 30, in this order, as shown in FIGS. 13A and 13B.

The light L4, transmitted through the half-mirror 33, is reflected by the total reflection mirror 38 and turned by the spatial filter 39 into diffused light from a point light source. The diffused light then is collimated by the collimator lens 40 to fall on the display device 41. The display device 41 is a transmission type image display device, comprised of, for example, a liquid crystal panel, and displays an image corresponding to image data furnished from the image data furnishing device 26. The light transmitted through the display device 41 is modulated in accordance with an image displayed on the display device 41 to fall on the cylindrical lens 42.

The light transmitted through the half-mirror 33 is converged by the cylindrical lens 42 in the transverse direction at a pre-set light collecting angle $\theta_c$. This converged light falls as the object light on the recording medium for hologram 30. That is, in this holographic stereogram printer 25, the projected light from the display device 41 falls on the recording medium for hologram 30 as the strip-shaped object light.

It is noted that the reference light and the object light are caused to fall on one and the other surfaces of the recording medium for hologram 30, respectively. That is, the reference light is caused to fall on one of the surfaces of the recording medium for hologram 30 at a pre-set angle of incidence, while the object light is caused to fall on the other surface of the recording medium for hologram 30 at a right angle. This causes the reference light and the object light to interfere with each other on the recording medium for hologram 30. The resulting interference fringes are recorded as changes in the refractive index on the recording medium for hologram 30.

The holographic stereogram printer 25 also includes a recording medium feed unit 43 for intermittently feeding the recording medium for hologram 30 under control by the control computer 24. Each time an image corresponding to the image data supplied from the image data furnishing device 26 is recorded as one elementary hologram on the recording medium for hologram 30, loaded in a pre-set state on the recording medium feed unit 43, the recording medium feed unit 43 intermittently feeds the recording medium for hologram 30 in an amount corresponding to an elementary hologram, based on the control signal from the control computer 24. In this manner, images derived from the image data furnished from the image data furnishing device 26 are sequentially recorded on the recording medium for hologram 30 so as to be contiguous in the transverse direction.

In the holographic stereogram printer 25, the optical path length of the reference light falling on the recording medium for hologram 30 after reflection by the half-mirror 33 is preferably of a substantially equal length to the optical path length of the object light transmitted through the half-mirror 33 to then fall on the recording medium for hologram 30. This increases the interference between the reference light and the object light to improve the image quality of the holographic stereogram.

For improving the image quality of the holographic stereogram, obtained by the holographic stereogram printer 25, a diffusion plate may be provided on the optical path of the object light. By arranging the diffusion plate on the optical path of the object light, noise components in the object light are diffused, while the light intensity distribution of the object light incident on the recording medium for hologram 30 becomes more uniform to improve the image quality of the generated holographic stereogram.

If the diffusion plate is provided in this manner, it is preferred to arrange a mask having a strip-shaped opening registering with the shape of the elementary hologram between the diffusion plate and the recording medium for hologram 30. By arranging the mask in this manner, redundant portions of the object light, diffused by the diffusion plate, are shielded by the mask, thus further improving the image quality of the produced holographic stereogram.

For affording a viewing angle in the longitudinal direction to the holographic stereogram, a one-dimensional diffusion plate may be provided on the optical path of the object light for diffusing the object light in the holographic stereogram printer 25. With the one-dimensional diffusion plate, provided on the optical path of the object light, the object light is diffused in the longitudinal direction, that is along the long-axis direction of the elementary hologram, so that the produced holographic stereogram has a viewing angle in the longitudinal direction.

If the one-dimensional diffusion plate is provided in this manner, a louver film having a fine screen-shaped lattice is preferably provided between the holographic stereogram 30 and the one-dimensional diffusion plate. By arranging the louver film in this manner, it is possible to prevent the reference light transmitted through the recording medium for hologram 30 from being reflected by the one-dimensional diffusion plate to fall again on the recording medium for hologram 30.

The holographic stereogram generating unit 23 operates as follows:

When preparing the holographic stereogram, the image data furnishing device 26 sends out image data to the display device 41 of the holographic stereogram printer 25 to cause the image for light exposure corresponding to the image data to be displayed on the display device 41. At this time, the image data furnishing device 26 sends out to the control computer 24 a timing signal indicating the effect of sending out image data to the display device 41 of the holographic stereogram printer 25.

On reception of the timing signal, the control computer 24 sends out a control signal to the light-exposure shutter 32 to open the light-exposure shutter 32 for a pre-set time. This exposes the recording medium for hologram 30 to light.

Of the laser light L2, radiated by the laser light source 31 and transmitted through the light-exposure shutter 32, the light L3, reflected by the half-mirror 33, falls on the recording medium for hologram 30 as the reference light. The light L4, transmitted through the half-mirror 33, becomes the projected light, projecting the image displayed on the display device 41. This projected light falls on the recording medium for hologram 30 as the object light. This records the image for light exposure, displayed on the display device 41, on the recording medium for hologram 30 as the strip-shaped elementary hologram.

When the recording of an image on the recording medium for hologram 30 comes to a close, the control computer 24 causes a control signal to be sent to the recording medium feed unit 43 to feed the recording medium for hologram 30 by one elementary hologram.

The above-described operation is repeated as the images for exposure displayed on the display device 41 are changed over in the sequence of the parallax image string. This sequentially records the images for light exposure, corresponding to the image data supplied from the image data furnishing device 26, on the recording median for hologram 30, as strip-shaped elementary holograms.

Meanwhile, there are occasions wherein, in sequentially recording the elementary holograms in this manner, the recording medium for hologram 30 is subjected to slight vibrations. In such case, subsidence of the vibrations is awaited each time the recording medium for hologram 30 is fed, and the elementary holograms are recorded after the subsidence of the vibrations.

Thus, in the present holographic stereogram generating unit 23, image data are sequentially supplied from the image data furnishing device 26 to the holographic stereogram printer 25, the images for exposure corresponding to the image data are sequentially displayed on the display device 4, the light-exposure shutter 32 is opened for each image and the respective images are sequentially recorded on the recording medium for hologram 30 as the strip-shaped elementary holograms. Since the elementary holograms are fed one elementary hologram for each image, the elementary holograms are arrayed in succession on the recording medium for hologram 30 in the transverse direction. This records the parallax image string, composed of plural images having the parallax information in the transverse direction, as plural elementary holograms consecutive to one another in the transverse direction, on the recording medium for hologram 30, thus yielding a holographic stereogram having the parallax in the transverse direction.

Figure 14:
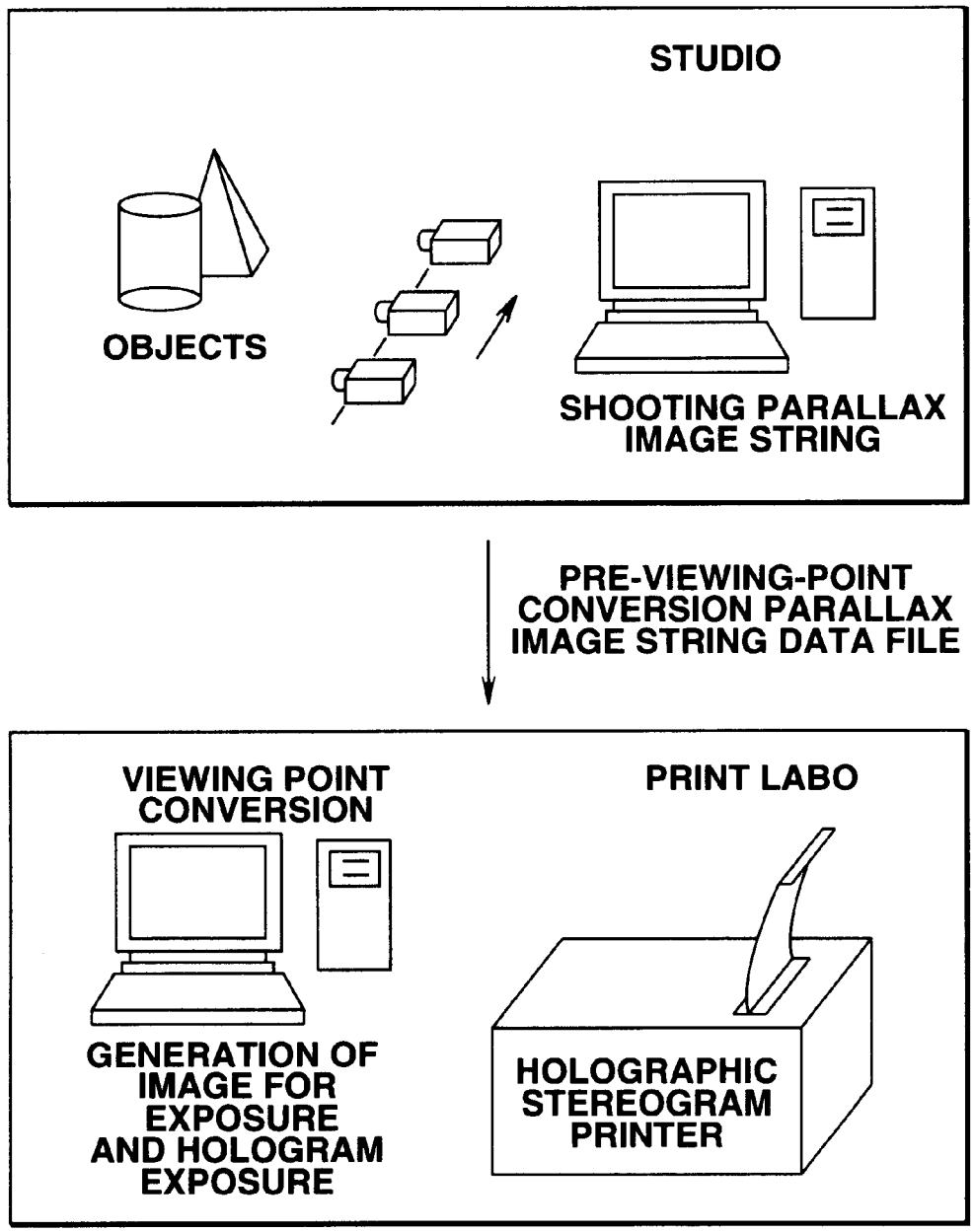
FIG. 14 shows the manner in which a studio for imaging a parallax image string and a printing laboratory for generating a holographic stereogram are provided independently of each other.
Figure 15:
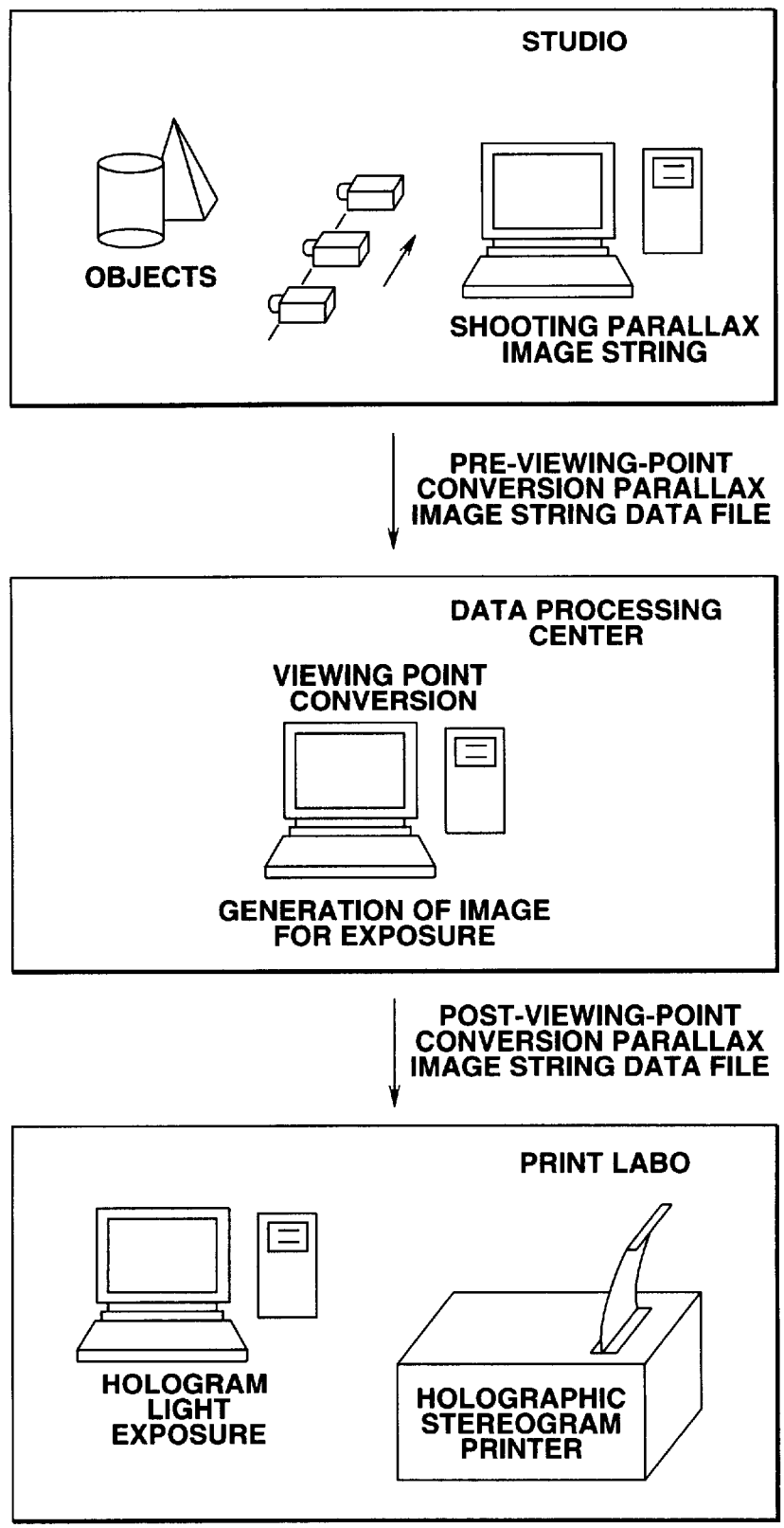
FIG. 15 shows the manner in which a studio for imaging a parallax image string, a data processing center for performing viewing point conversion processing and a printing laboratory for generating a holographic stereogram are provided independently of one another.

With the above-described holographic stereogram generating system, the image data generating device 1 and the holographic stereogram generating device 2 are independent of each other, as shown in FIG. 5. Between these devices, data exchange occurs using a pre-viewing-point conversion parallax image string data file. Thus, in the above-described holographic stereogram generating system, it becomes possible to provide a studio for imaging the parallax image string and a printing laboratory generating the holographic stereogram, independently of each other, as shown in FIG. 14. That is, the studio having the image data generating device 1 and the printing laboratory having the holographic stereogram generating device 2 can be provided independently of each other with data exchange therebetween via a recording medium or over a network.

In the above-described holographic stereogram generating system, viewing-point conversion processing is taken charge of by the holographic stereogram generating device 2. Alternatively, an image data conversion device for performing the viewing point conversion processing may be provided independently of the holographic stereogram generating device 2. In this case, the data receiving unit 21 and the viewing point conversion unit 22 of the holographic stereogram generating device 2 are provided on the image data conversion device.

If the image data conversion device is provided as an independent device, it is possible to provide a studio used for imaging a parallax image string, a data processing center having the image data conversion device responsible for viewing point conversion processing and a printing laboratory used for formulating the holographic stereogram, independently of one another, and to effect data exchange therebetween via a recording medium or over a network. In this case, it is the pre-viewing-point conversion parallax image string data file that is delivered from the studio to the data processing center, while it is the post-viewing-point conversion parallax image string data file that is delivered from the data processing center to the printing laboratory.

Viewing Point Conversion Processing

The viewing point conversion processing is hereinafter explained with reference to a specified example. Here, the viewing point conversion processing on the parallax image string imaged in accordance with the re-centering system is explained as an example.

Figure 16:
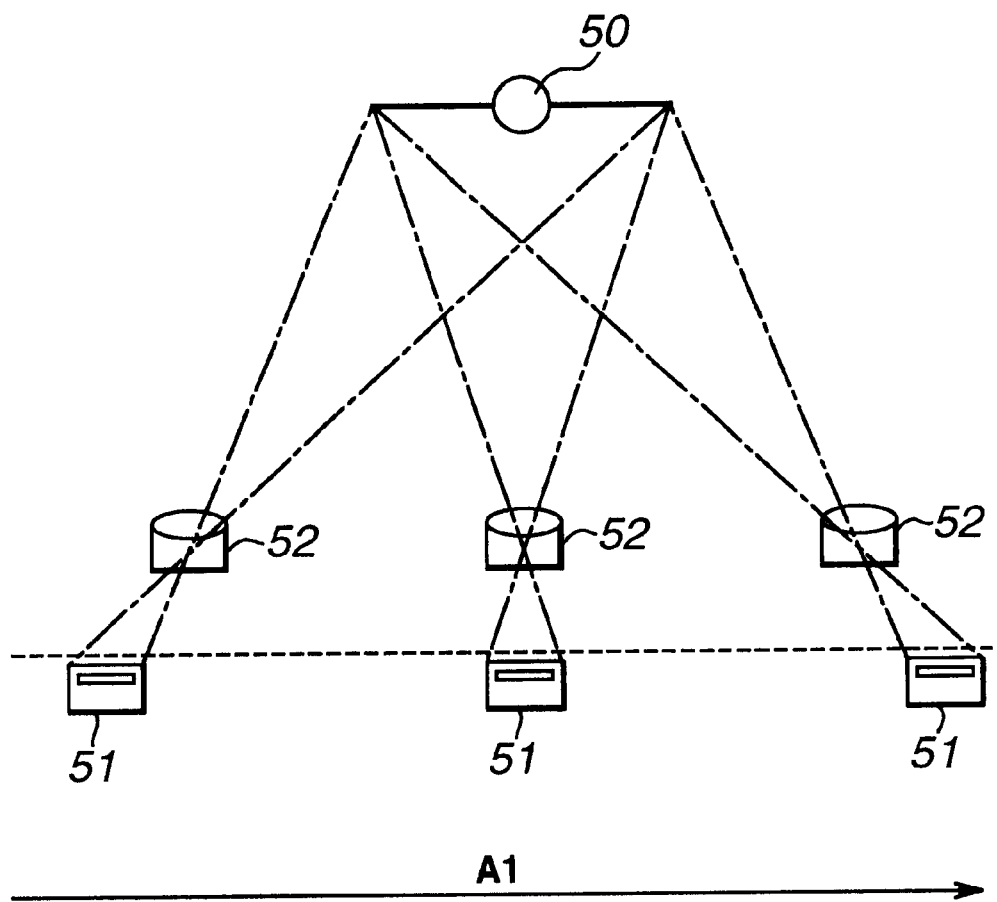
FIG. 16 shows the method for imaging a parallax image string by the re-centering system.

In the re-centering system, the object 50 is fixed, a camera 50 for imaging the object 50 is translated, a lens 52 of the camera 51 is moved in agreement with the shooting position so that the image of the object 50 will perpetually be at the center of the imaging plane and the object 50 is imaged a number of times form different positions, as shown in FIG. 16. This yields a parallax image string having the parallax in the transverse direction.

In the holographic stereogram, generated directly from the parallax image string of the object, the relative position between the viewing point of the camera 51 and the object 50 at the imaging time is maintained in the reproduced image of the generated holographic stereogram. Therefore, if the parallax image string as shot as described above is directly used in formulating the holographic stereogram, the reproduced image Z is formed at a position recessed a distance corresponding to the imaging distance at the time of imaging the parallax image string from the hologram plane Ha of the holographic stereogram H. Therefore, in this holographic stereogram H, distortion or blurring is produced in the reproduced image Z unless the image Z is viewed with the viewing point S set on the holographic plane Ha so that the distance d0 between the reproduced image Z and the viewing point S of the viewer will be coincident with the distance from the object 50 to the camera 51 at the time of imaging.

In particular, in a white reproduced holographic stereogram, reproduced with the white light, the remoter the imaging position of the reproduced image Z from the hologram plane Ha, the more the reproduced image Z tends to be blurred. Thus, if the reproduced image Z is formed at a recessed position from the hologram plane Ha, the reproduced image Z is blurred severely.

Figure 4:
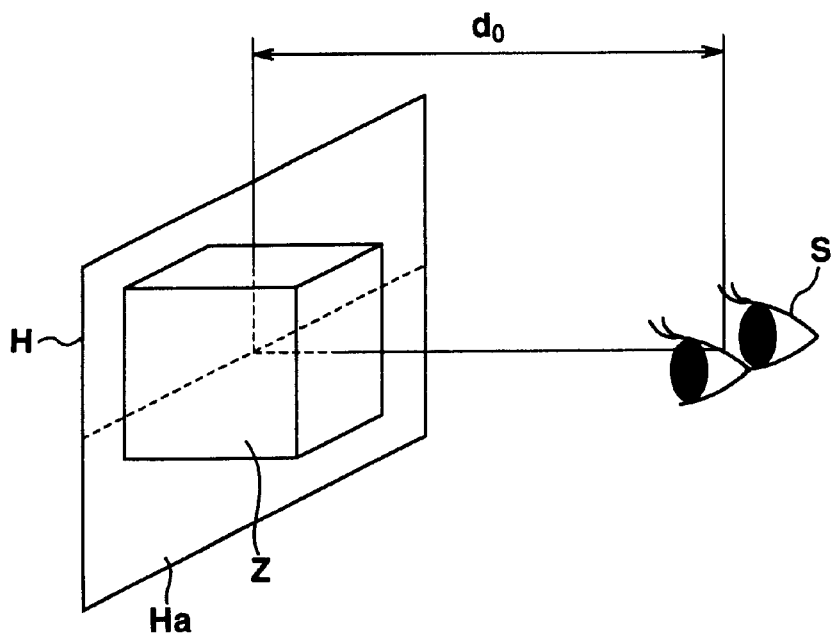
FIG. 4 shows the manner in which a reproduced image of a holographic stereogram generated on viewing point conversion processing is being viewed.

In this consideration, viewing point conversion processing is performed on the parallax image string, obtained as described above, so that the reproduced image Z will be formed in the vicinity of the hologram plane Ha, as shown in FIG. 4. That is, the parallax image string is processed with viewing point conversion processing so that the reproduced image Z will be formed in the vicinity of the hologram plane Ha, and the holographic stereogram is formulated using the parallax image string subjected to viewing point conversion processing. By this viewing point conversion processing, the reproduced image Z is fixed in the vicinity of the hologram plane Ha, as shown in FIG. 4, such that a clear reproduced image Z, suffering from distortion or blurring to a lesser extent, can be produced even if the viewing point S is set at a position remote from the hologram plane Ha.

Figure 17:
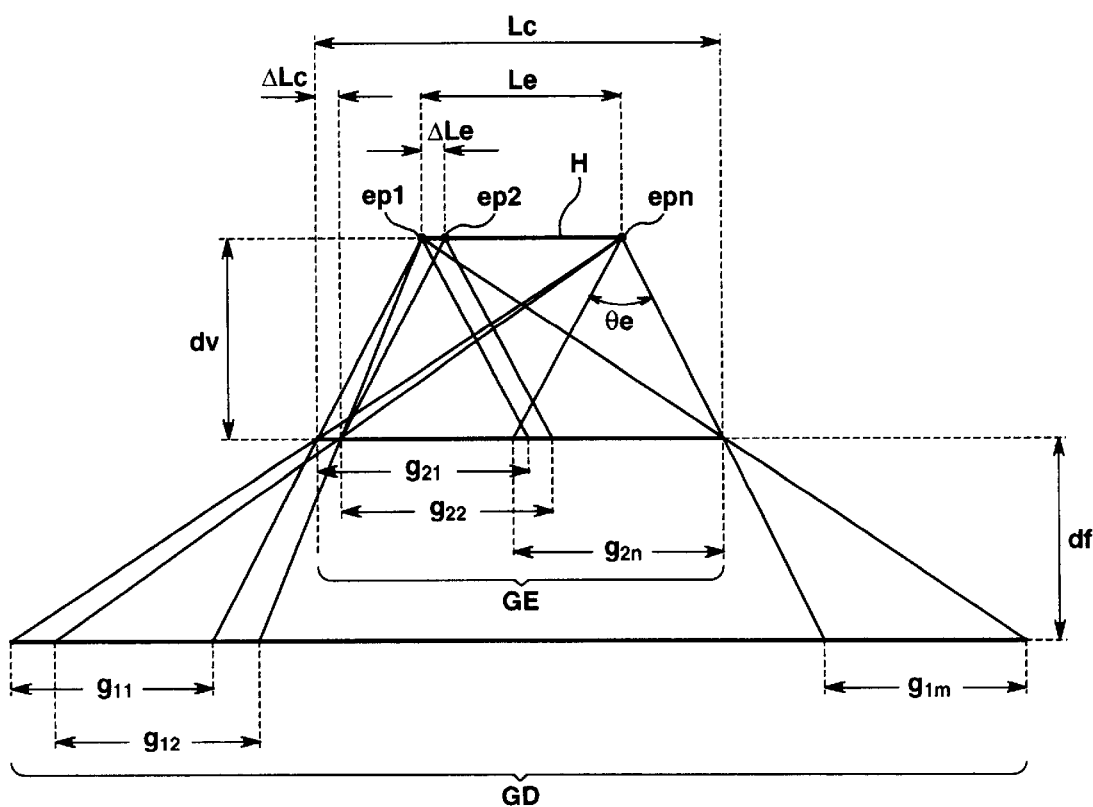
FIG. 17 illustrates the viewing point conversion processing and specifically the relation between a parallax image string for exposure GE and an original parallax image string GD.
Figure 18:
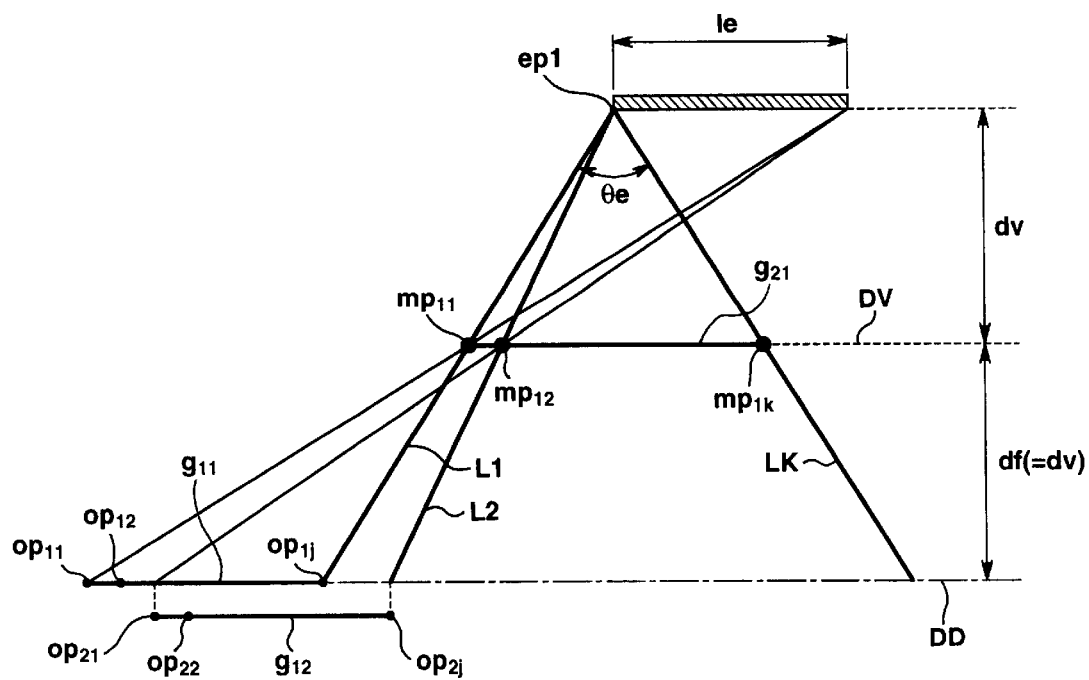
FIG. 18 illustrates the viewing point conversion processing and specifically the relation between one of images g21 of a parallax image string for exposure GE and respective images g11, g12, ..., g1m of an original parallax image string GD.

Referring to FIGS. 17 and 18, a specified example of the viewing point conversion processing is explained in detail. FIGS. 17, 18 illustrates the principle of performing viewing point conversion processing on a parallax image string made up of m images as shot by the re-centering system, referred to below as an original parallax image string, to re-construct a new parallax image string made up of n images, referred to below as a parallax image string for light exposure.

The parallax image string for light exposure is a parallax image string used for generating the holographic stereogram. That is, the holographic stereogram generating unit 23 sequentially displays the images of the parallax image string for light exposure, subjected to the viewing point conversion processing, on the display device 41, as described above, to generate the holographic stereogram.

Although the example given here is such a one in which a parallax image string obtained by the above-described re-centering system, that is the original parallax image string, is subjected to viewing point conversion processing to generate a new parallax image string, that is the parallax image string for light exposure, the technique of the viewing point conversion processing used in the present invention is not limited to the following example since any other suitable technique may be used depending on the parallax image string to be subjected to viewing point conversion processing.

In FIG. 17, g11, g12, . . . , g1m denote images constituting the original parallax image string, and the original parallax image string, made up of these images g11, g12, ..., g1m are collectively denoted GD. Also, g21, g22, ..., g2n denote images making up the parallax image string for light exposure, the parallax image string for light exposure, made up of these images g21, g22, ..., g2n, are collectively denoted GE.

In FIG. 17, there is shown the relative arrangement of respective light exposure points ep1, ep2, ..., epn of the holographic stereogram H having a length Le along the parallax direction, the respective images g21, g22, ..., g2n making up the parallax image string for light exposure GE and the respective images g11, g12, ..., g1m making up the original parallax image string GD. In these light exposure points ep1, ep2, ..., epn of the holographic stereogram H, the images g21, g22, ..., g2n making up the parallax image string for light exposure GE are recorded as elementary holograms.

In FIG. 17, only three points ep1, ep2, epn are shown as light exposure points for convenience in the drawing, there are, of course, n light exposure points in the holographic stereogram H, such that the n images g21, g22, ..., g2n making up the parallax image string for light exposure GE are recorded as elementary holograms at the respective different light exposure points.

The number of the light exposure points corresponds to the number n of the images making up the parallax image string for light exposure GE. The number of the light exposure points depends on the transverse size Le of the holographic stereogram H and on the pitch ΔLe of the light exposure points, as represented by the following equation (1):

$$Le = n \times \Delta Le \quad (1).$$

That is, if the transverse size Le of the holographic stereogram H is 10 cm and the light exposure pitch is equal and is 0.2 mm, the number of the light exposure points is 500.

Meanwhile, the pitch ΔLe of the light exposure points is the pitch of the elementary holograms and is one of parameters prescribing the resolution of the holographic stereogram H. That is, the smaller the pitch ΔLe of the light exposure points, the higher is the resolution of the holographic stereogram obtained.

In FIG. 17, ΔLc is the amount of movement of the camera 51 for each amount of movement of the camera 51 at the time of imaging of the original parallax image string GD, referred to below as the camera movement pitch. It is noted that Lc denotes the stun of movements of the camera 51 relative to the object 50 at the time of imaging of the original parallax image string GD, referred to below as the imaging width, while $d_f$ means the distance between the camera 51 and the object 50 at the time of imaging of the original parallax image string GD, referred to below as the imaging distance. On the other hand, $d_v$ denotes the distance between the viewing point S of the viewer of the holographic stereogram H and the hologram plane Ha, referred to below as the viewing point distance.

Although the pitch ΔLe of the light exposure points may be equal to the camera movement pitch ΔLc, these need not necessarily be equal to each other. However, the viewing point distance $d_v$ needs to be equal to the imaging distance $d_f$.

In the light exposure points of the holographic stereogram H, the images g21, g22, ..., g2n are exposed to light at a pre-set light exposure angle $\theta_e$.

It is assumed that the resolution of the respective images g11, g12, ..., g1m making up the original parallax image string and the images g21, g22, ..., g2n making up the parallax image string for light exposure is 640 pixels and 480 pixels in the longitudinal direction and in the transverse direction, respectively. Although these images are of the resolution of 640 pixels by 480 pixels, by way of an example, the number of pixels making up these images is arbitrary and is not intended for limiting the invention.

In the viewing point conversion processing, the respective images g11, g12, g1m making up the original parallax image string GD are converted in the viewing point position to re-construct plural images to formulate a parallax image string for light exposure GE. Specifically, the relation of correspondence between the images g11, g12, ..., g1m making up the original parallax image string GD and the images g21, g22, ..., g2n making up the parallax image string for light exposure GE is found and the pixels are interchanged based on the relation of correspondence thus found to re-construct the respective images images g21, g22, ..., g2n of the parallax image string for light exposure GE from the respective g11, g12, ..., g1m of the original parallax image string GD.

The pixels are interchanged with the slit-like pixel string of 640 pixels in longitudinal length and 1 pixel in transverse length as the smallest unit. That is, in the viewing point conversion processing, the required pixels are extracted from the g11, g12, ..., g1m of the original parallax image string GD on the pixel string basis to re-construct new images images g21, g22, ..., g2n. By handling plural pixels collectively at a time in interchanging the pixels, the processing required for viewing point conversion processing can be reduced more significantly than if the pixels are handled non-collectively. Moreover, since the slit-like pixel string of 640 pixels in longitudinal length and 1 pixel in transverse length represents the smallest unit of the parallax information, there is no fear of the parallax information being lost even if the pixels are interchanged in this manner on the pixel string basis.

Referring to FIG. 18, the above-described viewing point conversion processing is explained in more detail. FIG. 18 shows the manner in which the pixel g21, as one of the pixels making up the parallax image string for light exposure GE, is taken out and re-constructed from the original parallax image string GD.

In re-constructing the image g21, it is first assumed that the image g21 is on a plane DV separated by the viewing point distance $d_v$ from the holographic stereogram H. The image g21 has a pre-set image angle $\theta_e$ with respect to the light exposure points ep1 associated with the image g21.

It is also assumed that the images g11, g12, ..., g1m making up the original parallax image string GD are on a plane DD separated by the imaging distance $d_f$ from the image g21. The images g11, g12, ..., g1m making up the original parallax image string GD are arranged on the plane DD so as to be in register with the viewing point position at the time of imaging of the object 50

Let straight lines L1, L2, ..., Lk, referred to below as mapping lines L1, L2, Lk, be straight lines interconnecting the light exposure points ep1 associated with the image g21 and sampling points mp11, mp12, ..., mp1k on the image g21. These sampling points mp11, mp12, ..., mp1k correspond to the pixel string making up the image g21, with the number of the sampling points k in the image g21 corresponding to the number of pixels in the transverse direction, that is the parallax direction, of the image g21. Therefore, if the image g21 is 640 pixels by 480 pixels in the longitudinal direction and in the transverse direction, respectively, k=480.

Based on the above mapping lines L1, L2, ..., Lk, an image having the viewing point closest to the viewing point in each of the sampling points mp11, mp12, ..., mp1k is selected, from one sampling point to another, and an image string closest to the mapping line is selected from the selected image.

If, for example, a sampling point mp11 is considered, an image g11 having the viewing point closest to the sampling point mp11 is selected from the images g11, g12, ..., g1m making up the original parallax image string GD. The mapping line L1, interconnecting the light exposure point ep1 and the sampling point mp11 is extended to the plane DD. Then, from the sampling points op11, op12, ..., op1j of the image g11, the sampling point op1j, closest to the point of intersection of the mapping line L1 and the plane DD is selected. The image string, lying at the so-selected sampling point opj1, is extracted from the image g11, and is mapped to the sampling point mp11 of the image g21.

In the example of FIG. 18, it is assumed that there existj sampling points for the images g11, g12, ..., g1m making up the original parallax image string GD. That is, there exist sampling points op11, op12, ..., op1j for the image g11 of the original parallax image string GD and sampling points op21, op22, ..., op2j for the image g12. Similarly, there exist j sampling points for each of the remaining images. These sampling points are associated with the image strings of the images g11, g12, ..., g1m, with the number j of the sampling points in each image corresponding to the number of pixels in the transverse direction, that is the parallax direction, of the each image. Therefore, if the images g11, g12, ..., g1m are each composed of 640 pixels by 480 pixels in the longitudinal direction and in the transverse direction, respectively, k=480.

The above-described mapping is executed for the sampling points mp12, ..., mp1k of the image g21 to re-construct a new image g21. By executing the similar processing on the other light exposure points ep2, ep3, ..., epn, the respective images g22, g23, ..., g2n associated with the respective light exposure points are re-constructed. This gives the re-constructed parallax image string with viewing point conversion processing, that is the parallax image string for light exposure GE.

A holographic stereogram is generated by sequentially displaying the respective images g22, g23, ..., g2nmaking up the parallax image string for light exposure GE, on the display device 41, as described above, and by recording the images as slit-shaped elementary holograms on the recording medium for hologram 30.

In the holographic stereogram, thus generated, the viewing point is shifted, by the viewing point conversion processing, a distance corresponding to the viewing point distance $d_v$ from the hologram plane towards the viewer. In keeping therewith, the reproduced image also is shifted towards the viewer a distance corresponding to the viewing point distance $d_v$ so as to be fixed on or near the hologram plane. Thus, with the present holographic stereogram, there may be produced a reproduced image suffering from distortion or blurring to a lesser extent.

Meanwhile, the viewing point conversion processing is realized by interchanging pixel strings to form a new image. The interchanging sequence is the same, despite difference in the parallax image strings, if the parameters of the viewing point conversion processing remain the same. Therefore, if, in the viewing point conversion processing, the viewing points etc of the original parallax image string remain the same, there is no necessity of repeatedly performing the above-described processing. Thus, it is possible to provide a table stating the pixel sequence interchanging sequence and to refer to this table to interchange the pixel sequences.

That is, it suffices if the above-described viewing point conversion processing, described above, is carried out only initially to find the relation of correspondence between the pixel strings of the original image and the pixel strings of the image for light exposure, this relation of correspondence is stored in an external storage device, such as a hard disc drive, and to refer to this relation of correspondence in performing the second and the following viewing point conversion processing operations. This eliminates repetition of the computation processing to improve the processing speed significantly.

Header File

The header file, attached to the parallax image string file or to the parallax image string for light exposure, is hereinafter explained by taking a specified example.

If, when carrying out the viewing point conversion processing to formulate the holographic stereogram, the parameters for imaging a parallax image string, those for the viewing point conversion processing and those concerning the holographic stereogram being generated are not matched to one another, desired reproduced images cannot be obtained from the holographic stereogram. According to the present invention, the parameters required for the respective processes are monistically supervised and header files are attached to the parallax image string file or the image file for light exposure for utilization in the respective processes. In the following explanation, it is assumed that a header file attached to the parallax image string file and a header file attached to the image file for light exposure are of the format common to the two files.

It is assumed that, in the present example, the filename of the respective image files making up the parallax image string file having the attached header file is constituted by a letter string combined from a letter string common to the parallax image string files, a file number and a file extender specifying the image data form. That is, the filenames of respective image files making up the parallax image string file read holo0000.bmp, holo0001.bmp, ..., holo0499.bmp, by way of an example. On the other hand, the filenaines of respective image files are each made up of a letter string common to the parallax image string file, file number and the file extender indicating the form of the image data. Specifically, the filenames of respective image files making up a parallax image string for light exposure read hesp0000.bmp, hesp0001.bmp, ..., hesp0499.bmp, by way of an example.

Table 1 shows specified examples of the parameters stored in the header file attached to the parallax image string file or the image file for light exposure. Meanwhile, the parameters attached to the header file are not limited to those shown in Table 1, such that it is possible to increase or decrease items if so desired. Specifically, in generating a color holographic stereogram, it is desirable to provide items for parameters for realization the color matching.

TABLE 1

| header file |
| --- |
| para_img.file_name |
| para_img.date |
| para_img.time |
| para_img.num_img_file |
| para_img.file_type |

TABLE 1-continued header file para_img.img_type
hs_img.shooting_type
hs_img.file_name
hs_img.date
hs_img.time
hs_img.num_img_file
hs_img.file_type
hs.width
hs.height
hs.scr_width
hs.scr_height
hs.unit_hologram_pitch
hs.exposure_angle
cmra.scale
cmra.view_angle
cmra.view_distance
cmra.track_length The respective items of the header file shown in Table 1 are explained. In the above header file, the "hs_img.file_name", "hs_img.date", "hs_img.time", "hs_img.num_img_file" and the "hs_img.file_type" are left blank before viewing point conversion processing and entry is made for these items at the time of the viewing point conversion processing. Stated differently, these items are blank items at the stage of the header file of the parallax image string file and entry is made when the header file is to be that of the parallax image string for light exposure.

In the "para_img.file_name", a letter string specifying the parallax image string file corresponding to this header file is set. For example, the letter string common to the parallax image string, of the filenames of the respective image files making up the parallax image string, is set. That is, if the filenames of the respective image files making up the parallax image string file are holo0000.bmp, holo0001.bmp, . . . , holo0499.bmp, "holo" is set for the "para_img.file_name".

In the "para_img.date", the date of preparation of the parallax image string file is set.

In the "para_img.time", the time of preparation of the parallax image string file is set.

In the "para_img.num_img_file", the number of image files contained in the parallax image string file is set. For example, if the parallax image string file is made up of 500 image files, "500" is set in the "para_img.num_img_file".

In the "para_img.file_type", a letter string specifying the form of the image files making up the parallax image string file is set. For example, if the image files making up the parallax image string file are of the BMP form, the "BMP" is set in the "para_img.file_type".

In the "para_img.img_type", a letter string indicating how the parallax image string file has been generated is set. If, for example, the parallax image string file has been formulated on actually imaging an object, the "Real Image" is set in the "para_img.img_type", whereas, if the parallax image string file has been formulated by computer graphics, "CG" is set in the "para_img.img_type".

In the "para_img.shooting_type", a letter string specifying the method of imaging the parallax image string is set. For example, if the parallax image string is shot by the re-centering system, "re-centering" is set in the "para_img.shooting_type". If the parallax image string is shot by the straight track system, "straight track" is set in the "para_img.shooting_type". If the parallax image string is shot by the panning system, "panning" is set in the "para_img.shooting_type". Finally, if the parallax image string is shot by the rotating system, "rotating" is set in the "para_img.shooting_type".

In the "hs_img.file_name", a letter string specifying the parallax image string for light exposure corresponding to this header file is set. Specifically, a letter string common to the parallax image string for light exposure, among the filenames of the respective image files making up the parallax image string for light exposure, is set. That is, if, for example, the filenames of the respective image files making up the parallax image string for light exposure are hsep0000.bmp, hsep0001.bmp, . . . , hsep0499.bmp, "hsep" is set in the "hs_img.file_name".

In the "hs_img.date", the data of generation of the parallax image string for light exposure is set.

In the "hs_img.time", the time of generation of the parallax image string for light exposure is set.

In the "hs_img.num_img_file", the number of image files contained in the parallax image string file is set. For example, if the parallax image string for light exposure is made up of 500 image files, the "500" is set in the "hs_img.num_img_file".

In the "hs_img.file_type", a letter string indicating the form of respective image files making up the parallax image string for light exposure is set. If, for example, the respective image files making up the parallax image string for light exposure is of the BMP form, the "BMP" is set in the "hs_img.file_type".

In the "hs.width", the transverse width of the holographic stereogram to be generated is set.

In the "hs.height", the height of the holographic stereogram to be generated is set.

In the "hs.scr_width", the transverse width of a display device for displaying an image for light exposure in the holographic stereogram printer is set.

In the "hs.scr_height", the height of a display device for displaying an image for light exposure in the holographic stereogram printer is set.

In the "hs.unit_hologram_pitch", the transverse width of an elementary hologram recorded on a holographic stereogram to be generated is set.

In the "hs.exposure_angle", a light collecting angle of the object light at the time of light exposure of the recording medium for hologram is set.

In the "cmra.scale", the ratio between the Le value in FIG. 17 and the transverse width (hs.width) of the holographic stereogram to be generated is set. If the size of the object and that of the reproduced image of the holographic stereogram is equal to each other, the transverse width (hs.width) of the holographic stereogram to be generated becomes equal to the Le value in FIG. 17. However, if the size of the object differs from that of the reproduced image of the holographic stereogram, it is necessary to define the ratio of the Le value in FIG. 17 to the transverse width (hs.width) of the holographic stereogram to be generated. Thus, the value of Le/hs.width is set in "cmra.scale".

In the "cmra.view_angle", the horizontal angle of field of the camera used for imaging the parallax image string is set.

In the "cmra.view_distance", the imaging distance at the time of imaging of the parallax image string is set.

In the "cmra.track_length", the movement distance of the camera at the time of imaging of the parallax image string, that is a value indicating the movement range of the viewing point of the parallax image string, is set.

In the above explanation, it is presupposed that a planar holographic stereogram is to be generated. However, the shape of the holographic stereogram is not limited to the planar shape, such that it can, for example, be cylindrical. If the shape of the holographic stereogram is to be non-planar, the information on the shape of the holographic stereogram to be generated is required at the time of processing for viewing point conversion. Therefore, the information on the shape of the holographic stereogram generated is also added to the header file.

If, for example, a cylindrical holographic stereogram is to be generated, the information on the diameter of the cylindrical holographic stereogram to be generated is required in order to perform viewing point conversion processing associated with the cylindrical holographic stereogram. Therefore, in order to formulate the cylindrical holographic stereogram, an item specifying the diameter of the cylindrical holographic stereogram to be generated is provided in the header file.

If the above-described header file is added to the parallax image string, it is possible to perform viewing point conversion processing corresponding to the parallax image string imaging and holographic stereogram generating conditions to re-construct the parallax image string for light exposure. If such header file is added to the parallax image string for light exposure to construct the post-viewing-point conversion parallax image string data file, the information on the particular conditions under which the viewing point conversion processing has been executed and the relation of correspondence between the parallax image string file and the image file for light exposure can be known only from the post-viewing-point conversion parallax image string data file.

If the above-described header file is attached to the parallax image string file or the image file for light exposure, the parallax image string file generating side can be independent from the side of performing viewing point conversion processing on the parallax image string file for exploiting it. Therefore, if the studio for imaging the parallax image string is mounted at a site remote from the printing laboratory for generating the holographic stereogram, as shown in FIG. 10, data required by the printing laboratory can be delivered from the studio to the printing laboratory to formulate the holographic stereogram.

What is claimed is:

1. An image data generating apparatus comprising:
    an image generator generating a parallax image string data that comprises a plurality of images of an object, the plurality of images corresponding to different viewing points,
    a data attachment section attaching a header file data necessary for performing a viewing point conversion process on said parallax image string data, and
    said header file data contains information related to conditions that are used for capturing said plurality of images from said different viewing points.

2. The image data generating apparatus according to claim 1, wherein:
    said header file data is configured in such a way that another information regarding a process to be applied on said parallax image string data can be added to said header file data.

3. An image data converting apparatus comprising:
    a receiver receiving a parallax image string data with its header file data, said parallax image string data comprising a plurality of images of an object,
    said plurality of images corresponding to different viewing points,
    a viewing point converter performing a viewing point conversion process on said received parallax image string data based on information contained in said header file data, and
    said header file data contains information related to conditions that are used for capturing said plurality of images from said different viewing points.

4. The image data converting apparatus according to claim 3, wherein:
    said viewing point converter generates a light exposure image string data after the viewing point conversion process, and
    said header file data is revised to further include information regarding condition used for exposure process to produce a holographic stereogram when the viewing point conversion process is performed.

5. The image data converting apparatus according to claim 3, wherein:
    said receiver receives said parallax image string data with its header file data through a network.

6. A holographic stereogram printing apparatus comprising:
    a receiver receiving a parallax image string data with its header file data, said parallax image string data comprising a plurality of images of an object, said plurality of images corresponding to different viewing points, said header file data containing at least information related to conditions that are used for capturing said plurality of images from said different viewing points,
    a viewing point converter performing a viewing point conversion process on said received parallax image string data based on information contained in said header file data to generate a light exposure image string data, and
    a holographic stereogram generator for producing a holographic stereogram using said light exposure image string data.

7. The holographic stereogram printing apparatus according to claim 6, wherein:
    said receiver receives said parallax image string data with its header file data through a network.

8. A holographic stereogram printing apparatus comprising:
    a receiver receiving a light exposure image string data with its header file data, said header file data containing at least information regarding condition used for exposure process to produce a holographic stereogram, and
    a holographic stereogram generator for producing a holographic stereogram using said light exposure image string data based on said information contained in said header file data,
    wherein said header file data contains information related to conditions that are used for capturing a plurality of images of an object from different viewing points.

9. The holographic stereogram printing apparatus according to claim 8, wherein:
    said receiver receives said light exposure image string data with its header file data through a network.

10. An image data transmission method comprising:
    generating a parallax image string data, said parallax image string data including a plurality of images of an object, said plurality of images corresponding to different viewing points,
    attaching a header file data necessary for performing a viewing point conversion process to said parallax image string data, said header file data containing information related to conditions that are used for capturing said plurality of images from said different viewing points.

11. The image data transmission method according to claim 10, wherein:

said header file data is configured in such a way that another information regarding a process to be applied on said parallax image string data can be added to said header file data.

12. An image data transmission method comprising:
receiving a parallax image string data along with header file data, said parallax image string data including a plurality of images of an object, said plurality of images corresponding to different viewing points, said header file data containing information related to conditions that are used for capturing said plurality of images from said different viewing points; and
performing a viewing point conversion process on said parallax image string data, said viewing point conversion process being performed based on information contained within said header file data.

13. The image data transmission method according to claim 12, further comprising:
generating a light exposure image string data after said step of performing said viewing point conversion process, and
revising said header file data to include information regarding a condition used for an exposure process to produce a holographic stereogram when said viewing point conversion process is performed.

14. The image data transmission method according to claim 12, wherein:
said parallax image string data is received data along with said header file data through a network.

15. A holographic stereogram printing method comprising:
receiving a parallax image string data along with corresponding header file data, said parallax image string data including a plurality of images of an object, said plurality of images corresponding to different viewing points, said header file data containing at least information related to conditions that are used for capturing said plurality of images from said different viewing points,
performing a viewing point conversion process on said received parallax image string data, said step of performing said viewing point conversion process being performed based on information contained within said header file data to generate a light exposure image string data, and
producing a holographic stereogram using said light exposure image string data.

16. The holographic stereogram printing method according to claim 15, wherein:
said parallax image string data is received along with said header file data through a network.

17. A holographic stereogram printing method comprising:
receiving a light exposure image string data with its header file data, said header file data containing at least information regarding condition used for exposure process to produce a holographic stereogram, and
producing a holographic stereogram using said light exposure image string data based on said information contained in said header file data,
wherein said header file data contains information related to conditions that are used for capturing a plurality of images of an object from different viewing points.

18. An image data transmission method comprising:
transmitting image data for generating a holographic stereogram through a network, wherein
said image data includes a header file and a parallax image string data that comprises a plurality of images of an object the plurality of images corresponding to different viewing points, and
said header file data contains at least information related to conditions that are used for capturing said plurality of images from said different viewing points, and is configured in such a way that another information regarding a process to be applied on said parallax image string data can be added to said header file data.

19. The image data generating apparatus according to claim 1, wherein:
said information included in said header file data includes at least information about the relative position between a device for capturing said plurality of images and said object.

20. The image data converting apparatus according to claim 3, wherein:
said information included in said header file data includes at least information about the relative position between a device for capturing said plurality of images and said object.

21. The holographic stereogram printing apparatus according to claim 6, wherein:
said information included in said header file data includes at least information about the relative position between a device for capturing said plurality of images and said object.

22. The holographic stereogram printing apparatus according to claim 8, wherein:
said information included in said header file data includes at least information about the relative position between a device for capturing said plurality of images and said object.

23. The image data transmission method according to claim 10, wherein:
said information included in said header file data includes at least information about the relative position between a device for capturing said plurality of images and said object.

24. The image data transmission method according to claim 12, wherein:
said information included in said header file data includes at least information about the relative position between a device for capturing said plurality of images and said object.

25. The holographic stereogram printing method according to claim 11, wherein:
said information included in said header file data includes at least information about the relative position between a device for capturing said plurality of images and said object.

26. The holographic stereogram printing method according to claim 17, wherein:
said information included in said header file data includes at least information about the relative position between a device for capturing said plurality of images and said object.

27. The image data transmission method according to claim 18, wherein:
said information included in said header file data includes at least information about the relative position between a device for capturing said plurality of images and said object.

* * * * *